United States Patent [19]
Walton

[11] Patent Number: 5,598,660
[45] Date of Patent: Feb. 4, 1997

[54] APPARATUS FOR TYING FISHING LINE TO A LURE

[76] Inventor: Robert T. Walton, 3150 Country Club Rd., Lancaster, Ohio 43130

[21] Appl. No.: 450,028

[22] Filed: May 26, 1995

[51] Int. Cl.⁶ ............................................. A01K 91/04
[52] U.S. Cl. ............................... 43/44.83; 43/42.49
[58] Field of Search .................... 43/44.83, 44.84, 43/44.85, 42.23, 42.49

[56] References Cited

U.S. PATENT DOCUMENTS

| | | | |
|---|---|---|---|
| 3,073,636 | 1/1963 | Boutwell | 43/44.83 |
| 3,138,840 | 6/1964 | Rich | 43/44.84 |
| 3,293,791 | 12/1966 | Hinkson | 43/42.49 |
| 3,613,290 | 10/1971 | Louthan | 43/43.13 |
| 3,675,276 | 7/1972 | Nuse | 43/42.49 |
| 3,724,034 | 4/1973 | Osano | 43/44.83 |
| 3,785,011 | 1/1974 | Marks | 43/44.83 |
| 3,988,852 | 11/1976 | Klein | 43/44.83 |
| 4,117,574 | 10/1978 | Yoshida | 43/44.83 |
| 4,177,598 | 12/1979 | Jolley | 43/42.49 |
| 4,471,556 | 9/1984 | Dworski | 43/42.23 |
| 4,649,664 | 3/1987 | Mahan | 43/44.83 |
| 4,869,014 | 9/1989 | Francklyn | 43/44.6 |
| 4,991,339 | 2/1991 | Gibson | 43/42.49 |
| 5,197,220 | 3/1993 | Gibbs | 43/42.09 |
| 5,211,354 | 5/1993 | Rummage | 242/125.1 |
| 5,279,067 | 1/1994 | Tollison | 43/44.83 |

*Primary Examiner*—Joseph J. Hail, III
*Assistant Examiner*—Jay A. Stelacone
*Attorney, Agent, or Firm*—Kremblas, Foster, Millard & Pollick; Sidney W. Millard

[57] ABSTRACT

A piece of fishing tackle is attached to a fishing line, intermediate the ends of the line, by holding one portion of the fishing line stationary while looping the line at least one and one-half times around a transversely extending shoulder projecting from the fishing tackle piece. The shoulder has a circumferentially extending groove which allows the fishing line to be trapped in the bottom of the groove by the overlying loops, thereby securing the piece of fishing equipment to the fishing line.

24 Claims, 4 Drawing Sheets

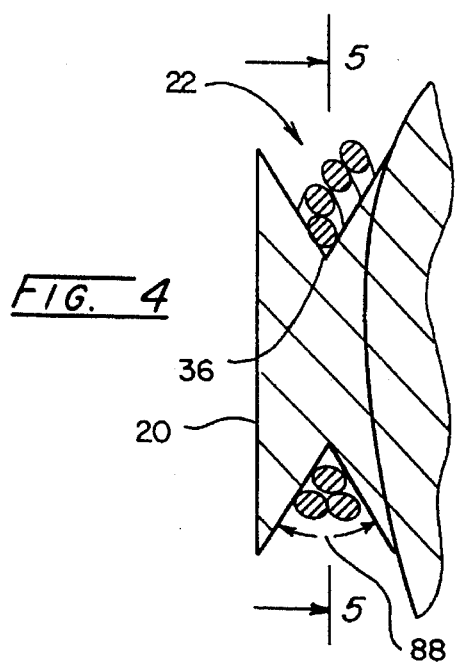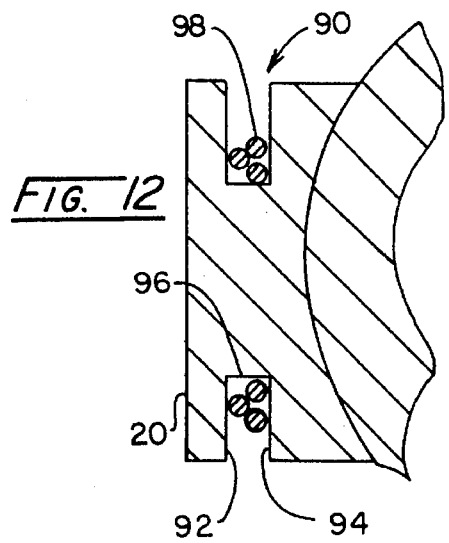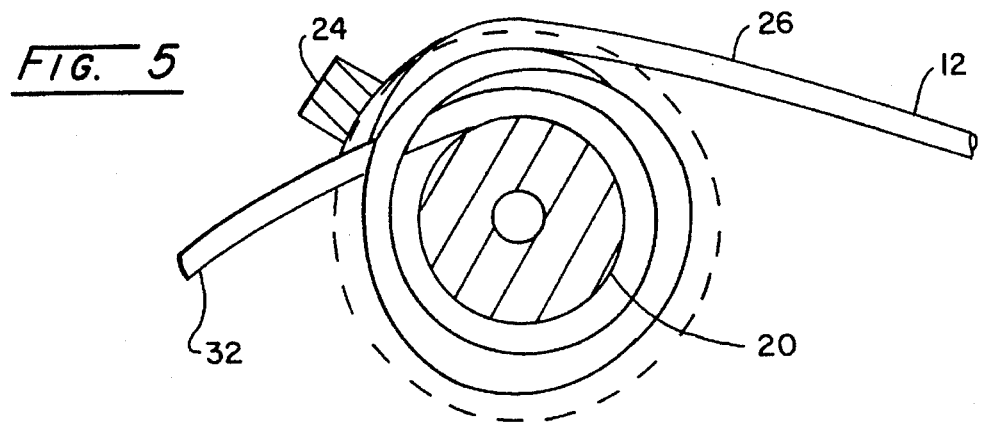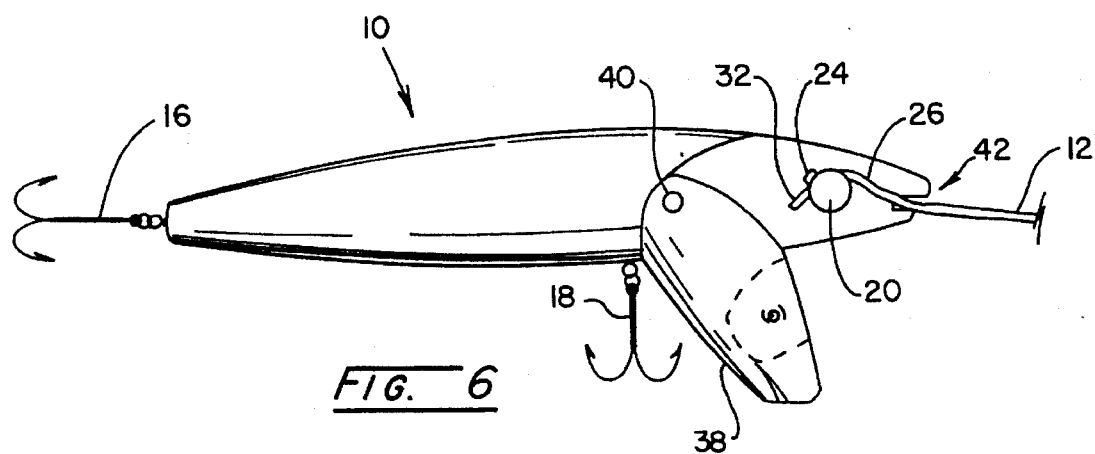

5,598,660

APPARATUS FOR TYING FISHING LINE TO A LURE

FIELD OF THE INVENTION

This invention relates to a quick and easy procedure and apparatus for connecting a piece of fishing equipment to a fishing line without tying a knot in the fishing line.

BACKGROUND OF THE INVENTION

Preparation of fishing tackle prior to the start of a fishing trip is something all fishermen go through. Tying flies, assembling lures, segregating hooks of various sizes, collecting spools of fishing line of various weights, etc. is conventional. It is time-consuming but the time spent is not a burden to the fishermen because it is not time taken away from fishing.

The problem of connecting fishing tackle or various pieces of fishing equipment to a fishing line while the fisherman is trying to fish is a frustrating chore in the field. Connecting a sinker, a float, a marker, a lure or the like to a fishing line in a rocking boat, during wet and cold conditions, is not an easy chore. Indeed, tying the right kind of knot to attach the line to a particular piece of fishing tackle is something learned over years of practice, not easily learned by a novice fisherman. This is a particular problem for young children and people with arthritic fingers.

What is needed in the field is a quick and simple apparatus to assist a fisherman in mounting a piece of fishing tackle to a fishing line without having to tie a knot. An example of such apparatus is disclosed in U.S. Pat. No. 3,724,034 which discloses a mounting system where a free end of the fishing line is clamped between a pair of converging metal parts of a wire form and then a plurality of loops encircle the double-thickness of wire.

A similar means for attaching fishing tackle to a fishing line without a knot is disclosed in U.S. Pat. No. 3,785,011 which discloses doubling a length of the line and hooking the folded portion around a metal hook portion of an attachment and looping the double line around an extended wire portion.

Two other U.S. Pat. Nos. 4,117,574 and 4,649,664 disclose an attachment mechanism which could be used for attaching a fishing line to a piece of fishing equipment without tying knots, but each of them requires insertion of the fishing line through apertures in the attachment unit and in cold, wet weather with a rocking boat, this is not a solution to the identified problem.

U.S. Pat. No. 3,675,276 discloses a unique structure for attaching a fish hook to a fishing line without tying a knot at the time of the attachment. It does have a knot tied into the line, but it is clear from a reading that the knots are tied before the fishing trip is started.

U.S. Pat. No. 4,869,014 discloses attaching a fishing lure to a fishing line by inserting the line through some openings in the lure and then crimping the inserted line between a pair of converging surfaces, but the problem of performing that function in a rocking boat is not a solution to the problem being discussed.

U.S. Pat. No. 5,197,220 involves inserting the fishing line through openings in the fishing tackle and crimping an element to the end of the line.

U.S. Pat. No. 4,471,556 discloses a fishing lure with a plurality of locations for attachment of the fishing line and the purpose is to control the depth of the lure below the surface of the water, depending upon the location of the fishing line attachment.

U.S. Pat. No. 5,211,354 discloses attaching a thread to a spinning core by confining the thread in a V-shaped groove where the sides of the groove are textured to cause high friction.

SUMMARY OF THE INVENTION

For many years, fishing line was formed of woven strands of fiber of various kinds. Attachment of fishing apparatus to the fishing line was accomplished by inserting the line through an eyelet or aperture in the piece of fishing apparatus and tying the fishing line to itself with the loop of fishing line extending through the eyelet serving as the attachment mechanism. In more recent times, fishing line has been formed by monofilament polymers. Unfortunately, with the monofilament fishing lines, knots in the line tend to weaken the line to a greater extent than the line of similar strength made from woven fibers. As a result, there is a need for an attachment mechanism for securing fishing tackle to fishing line by structural elements which do not require the tying of a knot.

Similarly, the speed with which one can attach a fishing lure to a fishing line often bears upon the number of fish caught at a critical time.

During the discussion of the structural features of this invention, all references to fishing tackle, pieces of fishing apparatus, and the like should be considered in their broadest aspect. The terms are used interchangeably to refer to fishing lures, sinkers, floats and such other pieces of conventional fishing equipment as may be found in sporting goods stores and fishing tackle boxes of fishermen.

Further, throughout the application, reference will be made to a "free end" of a fishing line and a "forwardly extending portion". These terms are used for descriptive purposes only and should not be construed as meaning that the fishing line terminates. For example, references to the "free end" of the fishing line are intended to refer to that portion of the fishing line remote from the reel of a fishing pole with a fishing lure, float, etc. tied to the line intermediate the "free end" and the "forwardly extending portion" which is closer to the reel. For purposes of this invention and the language used herein, the "free end" could extend two or three hundred feet beyond the fish hook and away from the fishing reel.

The basic inventive concept is to provide a transversely extending shoulder on the piece of fishing apparatus one desires to attach to the fishing line. A circumferentially extending groove is formed in the shoulder to receive a strand of fishing line from the free-end of the fishing line and deposited in the bottom of the groove. Thereafter, at least one loop of fishing line is pulled around the shoulder and compressed into the bottom of the groove to hold the confined bottom strand in friction and compression to thereby attach the fishing piece to the fishing line. The balance of the fishing line will extend forwardly toward the fishing reel.

Because of the physical properties of monofilament fishing line, the line will tend to try to expand radially out of the groove and unwind the loops made unless the line is maintained in constant tension. In order to counteract this physical tendency of the fishing line, a block is formed in association with the shoulder to extend across the groove, such that the spacing between the radially outer surfaces of the shoulder at the edges of the groove are spaced from the block a distance less than the thickness of the fishing line. Thereby, the line cannot escape the groove unless it is pulled transversely with considerable force such that the block and fishing line in combination deform and flex to allow the line to snap out of the groove. Conversely, when the loops are being formed, each turn of the loop past the block requires a transverse force by the person forming the loop to pull the fishing line against the gap between the block and the shoulder such that each loop will snap into place in the groove.

As will be clear from the description of the preferred embodiment, the exact location of the shoulder on the lure may be adjusted by additional accommodating structural elements mounted on the fishing equipment. Such additional equipment or structural elements may adjust the divergence of the fishing equipment from the fishing line in at least one embodiment to be explained subsequently, the point of divergence may be controlled by the assembler of the apparatus to thereby control the depth of trolling of the fishing lure.

Objects of the invention not understood from the above, will be fully understood upon the review of the drawings and the description of the preferred embodiments which follow.

BRIEF DESCRIPTION OF THE DRAWINGS

FIG. 4 is a fragmentary sectional view taken along line 4—4 of FIG. 3;

FIG. 5 is a fragmentary sectional view taken along line 5—5 of FIG. 4;

FIG. 6 is a side elevational view similar to FIG. 1 but showing an alternative location for the attaching structure on the fishing lure;

FIG. 12 is a fragmental sectional view similar to FIG. 4 but illustrating a different shape for a groove in the attachment structure.

DESCRIPTION OF THE PREFERRED EMBODIMENTS

Figure 1:
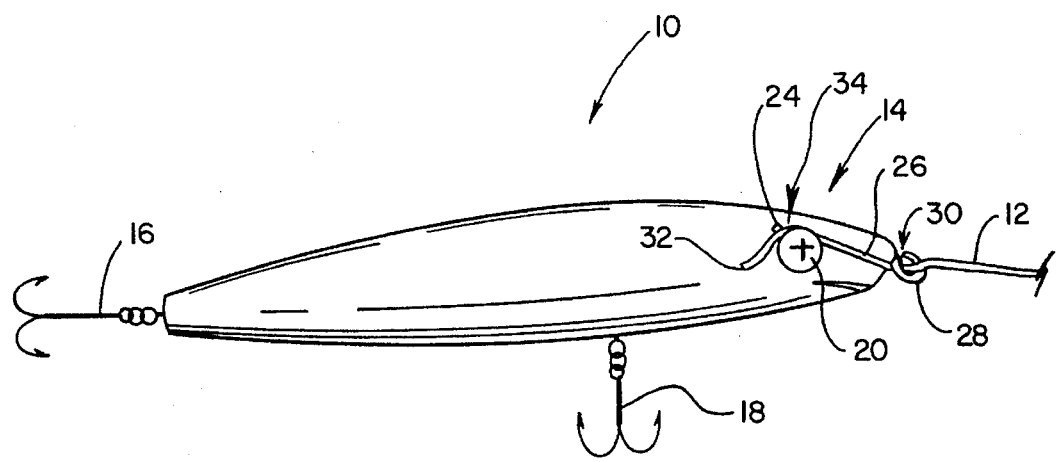
FIG. 1 is a side elevational view of a fishing lure attached to a fishing line according to this invention.
Figure 2:
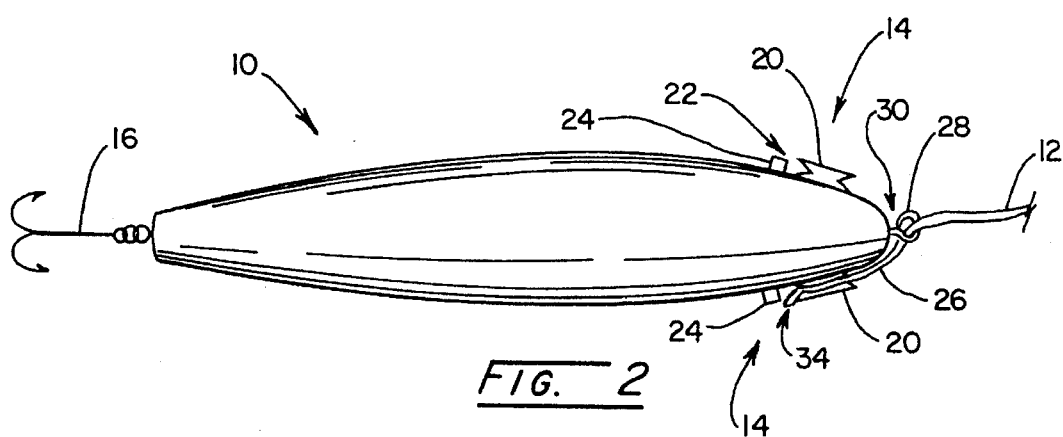
FIG. 2 is a top plan view of the fishing lure and line of FIG. 1.
Figure 3:
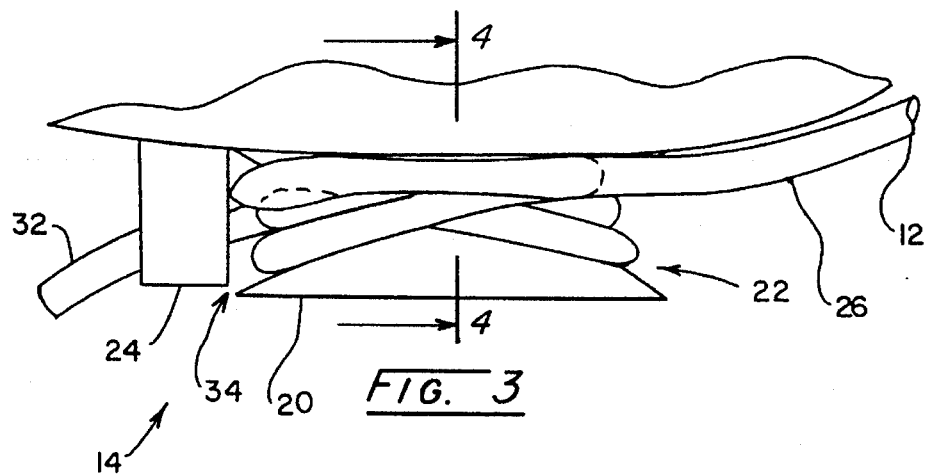
FIG. 3 is a fragmentary enlarged view of the fishing line attachment structure of this invention.

Looking particularly to FIGS. 1–3, a piece of fishing equipment illustrated as a fishing lure 10 is attached to a fishing line 12 by structure indicated generally at 14.

In this case, the lure 10 is designed in the shape of a fish and includes the conventional three-hook structure 16, 18 located in conventional fashion on the fish shaped lure.

The unique connecting structure 14 is located on the lure where the eye of the fish would be if the lure was indeed a fish. Specifically, the structure 14 includes a transversely extending shoulder 20 as best seen in FIG. 4. It will be observed in FIG. 2 that a transversely extending shoulder projects from the surface of the fish-shaped lure on each side of the lure. Thereby, fishing line may be attached from either side of the lure as will be explained in more detail subsequently.

A V-shaped groove 22 is formed to extend circumferentially around the shoulder 20 with the groove being aligned generally parallel with the sides of the lure although it is shown at a slight angle in FIG. 2 converging toward the nose of the fish-shaped lure. The groove 22 circumscribes an axis of said shoulder which extends generally perpendicular to the fishing line 12 projecting toward a reel. That is, the circumferentially extending groove is aligned generally parallel with said forwardly extending portion of line 12.

The shoulder 20 may be formed integral as a part of the lure or may be attached thereto by suitable adhesives or other mechanical structures such as screws.

A block 24 near the trailing part of the shoulder may be formed integral with the surface of the lure 10, as a part of shoulder 20 or a separately attached element as may be convenient.

It will be observed that a shoulder 20 is formed on each side of the fish-shaped element as best illustrated in FIG. 2 and that the forwardly extending portion 26 of fishing line 12 is threaded through a forward eyelet 28 at the nose of the fish-shaped lure 10. In conventional structure for most fishing lures, the eyelet 28 is a closed loop projecting from the nose of the lure. In this particular instance, the eyelet includes a gap 30 located on the opposite side from the operative shoulder 20 around which the fishing line 12 is looped. This is not an absolute requirement but it is preferred because of the physical characteristics of monofilament fishing line 12. Where the operative shoulder is on one side, the gap 30 should be on the other side as viewed in top plan view, FIG. 2, for ease of snapping the line 12 into the eyelet 28 and for other obvious reasons. Eyelet 28 of this invention is a guide for orienting the lure with the pull of the fishing line; eyelet 28 is not the primary attachment element as with conventional lures.

In operation, this first embodiment is secured to a fishing line 12 by hand operation where the fisherman will grasp the trailing end 32 of line 12 with his thumb and press it against the body of the lure 10 while the finger or fingers grip the lure. With his other hand, the fisherman will snap the fishing line into groove 22 through the gap 34 by applying force against block 24 and the peripheral edge of groove 22 which will cause deformation of the fishing line, block and peripheral edge to allow the line to snap into the groove 22 through gap 34.

Next, at least two loops are made around shoulder 20 and in each case, the fishing line is snapped into the groove 22 through gap 34 in the same fashion. It is usually not necessary to have more than one and one-half loops, because the outer loop will cram the trailing end 32 of the fishing line into the bottom 36 of the V-shaped groove 22 and will hold it in place by radial pressure and frictional contact as best illustrated in FIG. 4. Then the forwardly extending portion 26 of fishing line 12 is pulled under eyelet 28 and forwardly through gap 30 so that the lure 10 will be pulled in a relatively straight line direction by a pull of line 12 by a fishing reel or fishing line mounting apparatus on a boat (trolling) in a direction generally parallel with the centerline of lure 10. Preferably, the direction of rotation of loops around shoulder 20 is clockwise.

Looking now to FIG. 6, an alternative embodiment is illustrated where the holder 20 is formed or mounted internally of the outer surface of the lure 10. In this illustrated embodiment, the plane defined by the bottom 36 of groove 22 essentially bisects the lure 10 in a vertical direction.

In order to provide easy access to the shoulder 20, one side or the other 38 of the forward end of the lure is mounted on an axle 40 to allow it to pivot in a vertical plane to expose the shoulder 20. Thereby, a thumb of the fisherman can still engage the trailing end 32 of the fishing line and hold it in place as it is looped about shoulder 20 and snapped into place between the periphery of shoulder 20 and block 24, the same as illustrated in FIG. 3. In this particular embodiment, there is no eyelet 28. The forwardly extending portion 26 of the fishing line exits from an aperture 42 which might be in the general location of the mouth of a fish if the lure 10 was a fish.

Figure 7:
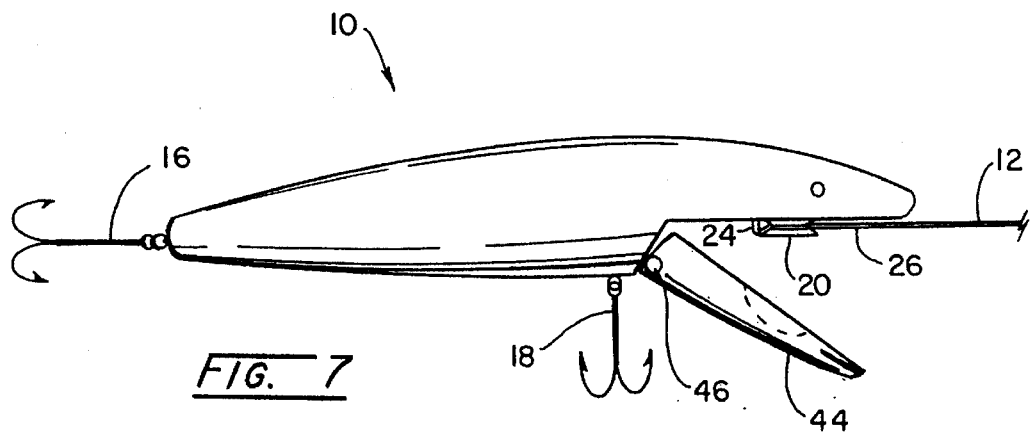
FIG. 7 is yet another alternative embodiment illustrated as a side elevational view similar to FIG. 1 with an alternative location for attachment structure.

FIG. 7 illustrates another embodiment of the invention where the shoulder 20 is rotated 90° such that the plane defined by bottom 36 of groove 22 generally bisects lure 10 in a horizontal plane rather than the vertical plane of FIG. 6. In this FIG. 7 embodiment, the bottom, front portion of the lure 44 pivots downward about an axis 46 to expose shoulder 20 for operative mounting of fishing line 12 in a fashion similar to what is illustrated in FIG. 3 and described earlier. In order to maintain the symmetrical pull of line 12 on lure 10, shoulder 20 may be offset to one side or the other or some sort of guide means, not illustrated in FIG. 7, ensures that the fishing line exits approximately in the center of the forward portion of the lure.

Figure 8:
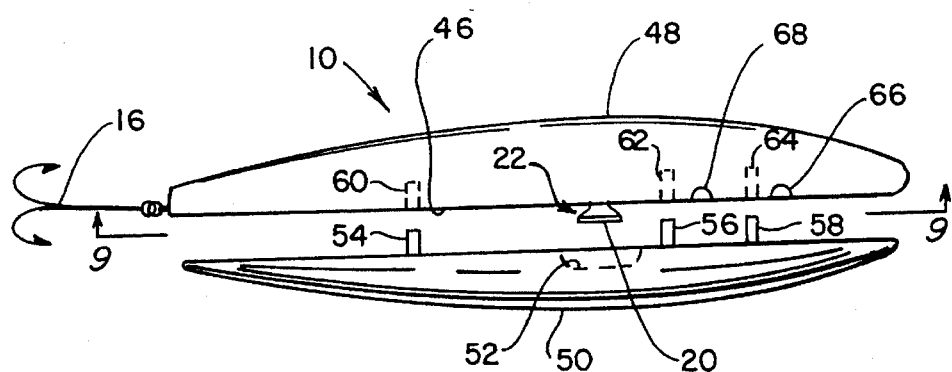
FIG. 8 is a top plan view similar to FIG. 2 showing yet an alternative embodiment for the location of the mounting structure for the fishing line.

FIG. 8 illustrates yet another alternative embodiment where the lure is bisected, either in a vertical plane or a horizontal plane and the groove 22 is formed by shoulder 20 and one side of the flat surface 46 of bifurcated element 48. Note that in the opposite side element 50 there is a cavity 52 to accommodate shoulder 20 when the two elements 48, 50 are snapped together after the line is looped around shoulder 20. Prongs 54, 56, 58 snap into openings 60, 62, 64 and provides some well-known frictional engagement to hold the two elements 48, 50 together in well-known conventional fashion.

Figure 9:
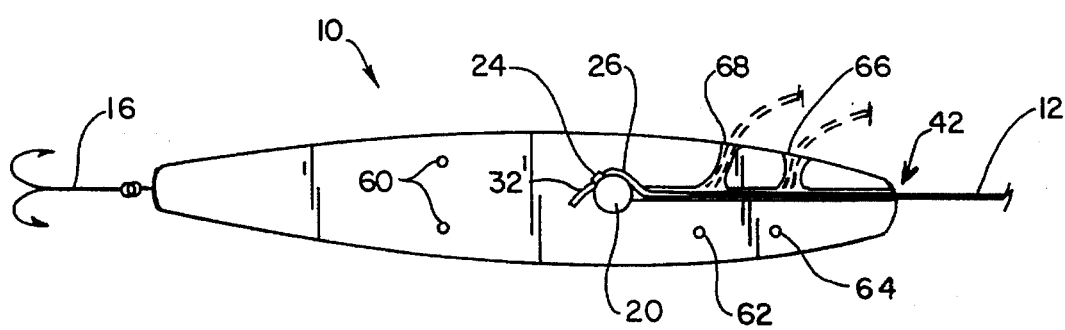
FIG. 9 is a side elevational view of the top half of the lure illustrated in FIG. 8 from the perspective of line 9—9 of FIG. 8.

An observation of FIG. 9 will show alternative exit apertures for fishing line 12 from the interior of lure 10. One illustration is through an aperture 42 generally in the location where one would expect the mouth of a fish. Alternative apertures 66 and 68 allow the fisherman to adjust the direction of force applied to the lure by the fishing line 12 (illustrated in phantom in FIG. 9). The higher on the lure for the operative aperture, the deeper in the water the lure will ride during trolling or reeling in.

Figure 10:
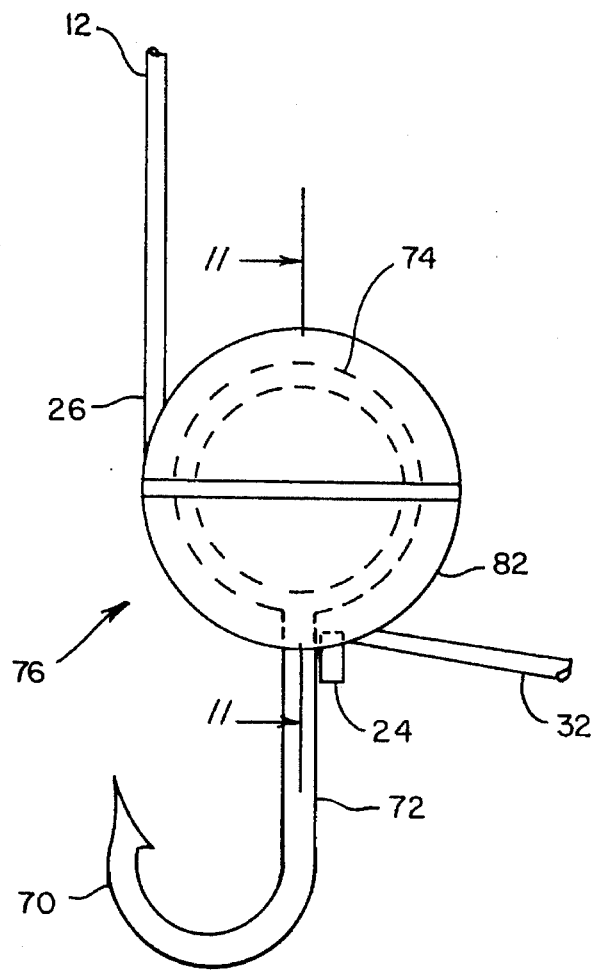
FIG. 10 is a side elevational view of a fish hook attached to a fishing line according to this invention.
Figure 11:
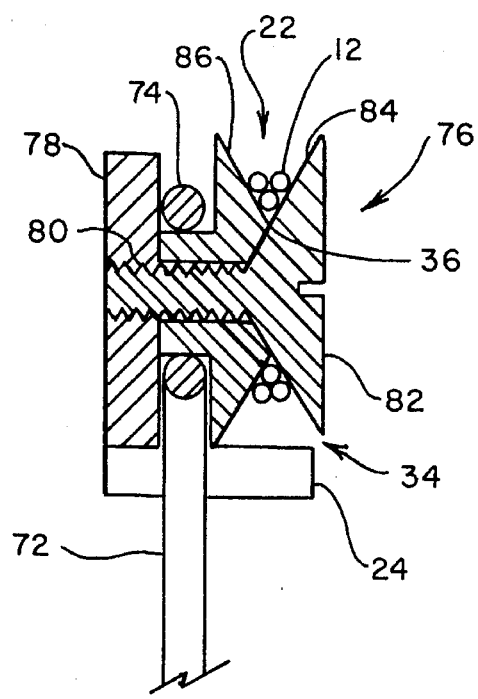
FIG. 11 is a sectional view taken along line 11—11 of FIG. 10.

FIGS. 10 and 11 illustrate a technique for mounting this invention on a fish hook 70. Hook 70 includes a vertically extending shank 72 with an eyelet 74 at one end.

To mount the shoulder structure 76, a nut 78 is mounted on one side of the eyelet to receive in mated, threaded engagement 80 a screw 82. The head 84 of screw 82 forms one slope of the V-shaped groove 22 described in earlier embodiments. The other side of groove 22 is formed by a cooperatively shaped ferrule. It will be observed that the block 24 is formed integral with nut 78 and serves the same purpose as the other blocks 24 described in the other embodiments. Additionally, block 24 as illustrated in FIGS. 10 and 11 also prevents the shoulder structure 76 from rotating with respect to eyelet 74 due to tension in the forwardly extending portion 26 of fishing line 12. Without block 24 extending from nut 78 transverse to hook shank 72, the shoulder structure 76 could rotate and allow the confined loops of fishing line crimped into the bottom 36 of the groove 22 to unreel and slip off the end of the fishing line and the hook would fall off the end of the fishing line. While it is not illustrated, the shoulder and groove could be molded to the shaft of the hook rather than being assembled as a multi-part attachment.

During the course of experimentation of various angular relationships for the divergence of the sides of the V-shaped groove 22, it was discovered that the angle 88, best illustrated in FIG. 4, should be in the range of 0° to 60°. Wider angles will work, but less effectively than the preferred angles. Wider angles require more loops.

FIG. 12 illustrates a shoulder 20 having a groove 90 with parallel sides 92, 94 and a flat bottom 96. Fishing line 98 is looped around shoulder 20 and pulled tight against bottom 96 such that the overlying strand compresses the initial or bottom strand against the bottom 96 and a side 94. This provides adequate friction to maintain the attachment where the width of groove 90 is in the range of 100%–180% of the diameter of line 98.

It may be that the geometry of a plane through the bottom 36, 96 of the groove 22, 90 would not be a circle as illustrated in the drawings. The cross-section could define a square, triangle, oval, star, etc. From an engineering concept of stress concentration points it might be an advantage to have a non-curved shape; when the lure is hung up on weeds or rocks, the fisherman would prefer that any break in the line occur at the lure rather than intermediate the lure and the reel. The less line lost due to a break, the better. Shape angles at the shoulder could promote breakage of the line at the lure when line breakage is required.

Having described the invention in its preferred embodiments, it will be clear that other structures of corresponding functional structure may be useful. It is not intended that the language used to describe the preferred embodiments nor the illustrations of the same be limiting on the invention. Rather, it is intended that the invention be limited only by the scope of the appended claims.

I claim:

1. Apparatus for connecting a fishing line to a piece of fishing equipment without tying a knot in the line comprising in combination, a fishing line having a free end and a forward portion, said line being secured to said piece intermediate said free end and said forward portion by friction and compressive forces, said portion extending forwardly from said piece, said fishing line being looped at least one and one-half times around a shoulder projecting from said piece, said shoulder projecting generally transversely of said forwardly extending portion of said fishing line, said shoulder having a periphery, the periphery of said shoulder including a circumferentially extending groove having a bottom, said groove receiving a section of line near said free end and with the section of fishing line nearest said free end being compressed into the bottom of the groove by said looped fishing line which overlies said fishing line section, said groove being aligned generally parallel with said forwardly extending portion of said line, said free end extending from said groove in a relaxed state without tension.

2. The apparatus of claim 1 wherein said groove defines a circular path around said shoulder.

3. The apparatus of claim 2 including a block extending across said groove and spaced from said shoulder a distance less than the diameter of said fishing line, said block and fishing line in combination being sufficiently resilient to allow the fishing line to snap into said groove between said shoulder and block during the formation of said looped fishing line around said shoulder.

4. The apparatus of claim 3 wherein said groove defines an included angle in the range of 0°–60°.

5. The apparatus of claim 4 wherein said piece comprises a fishing lure having an exterior surface, said shoulder being located at the exterior surface of said lure.

6. The apparatus of claim 5 wherein said lure is generally in the shape of a fish, the shoulder being located on said lure at a position corresponding to where one of the eyes of a fish would be if the fish-shaped lure was a fish.

7. The apparatus of claim 6 wherein said lure has a forward portion in the form of a nose and including a slotted guide projecting forwardly from the nose, thereby said forwardly projecting portion of said line may extend from said shoulder, through said slotted guide and beyond.

8. The apparatus of claim 4 wherein said piece comprises a fish hook having a circular eye on one end, said shoulder projecting from said eye.

9. The apparatus of claim 4 wherein said shoulder is located within a fishing lure and said forwardly extending portion of said fishing line projects through an opening from within said lure.

10. The apparatus of claim 9 including a plurality of openings in said lure from which said forwardly extending portion may project, thereby allowing a user to select various angles for the line to project from said lure and pull the lure.

11. The apparatus of claim 1 wherein said piece comprises a fishing lure having an exterior surface, said shoulder being located at the exterior surface of said lure.

12. The apparatus of claim 1 wherein said shoulder is located within a fishing lure and said forwardly extending portion of said fishing line projects through an opening from within said lure.

13. The apparatus of claim 12 including a plurality of openings in said lure from which said forwardly extending portion may project, thereby allowing a user to select various angles for the line to project from said lure and pull the lure.

14. The apparatus of claim 1 wherein said piece comprises a fish hook having a circular eye on one end, said shoulder projecting from said eye.

15. The apparatus of claim 1 including a block extending across said groove and spaced from said shoulder a distance less than the diameter of said fishing line, said block and fishing line in combination being sufficiently resilient to allow the fishing line to snap into said groove between said shoulder and block during the formation of said loops around said shoulder.

16. The apparatus of claim 1 wherein said groove defines an included angle in the range of 0°–60°.

17. A process for connecting a piece of fishing equipment to a fishing line without tying a knot comprising, providing a piece of fishing equipment having a shoulder thereon, providing a groove having a peripheral edge and a bottom in said shoulder, securing a fishing line against longitudinal movement at a location near said groove, placing said fishing line in the bottom of said groove and maintaining said line in tension, drawing said line around said shoulder to form at least one and one-half loops while maintaining said tension to lock the piece to the line, releasing said line from where it is secured against longitudinal movement.

18. The process of claim 17 including making said loops in a clockwise direction around said shoulder.

19. The process of claim 18 including providing a block extending across said groove to prevent accidental unwinding of said looped fishing line and being spaced from the peripheral edge of said groove a distance less than the thickness of said fishing line, applying force to said line between said block and shoulder to snap said line into said groove during the formation of each loop.

20. The process of claim 17 including providing a block extending across said groove to prevent accidental unwinding of said looped fishing line and being spaced from the peripheral edge of said groove a distance less than the thickness of said fishing line, applying force to said line between said block and shoulder to snap said line into said groove during the formation of each loop.

21. An apparatus for connecting a fishing line to a piece of fishing equipment, comprising in combination:

(a) a shoulder projecting from the piece of fishing equipment defining a surface having a circumferentially extending groove therein; and (b) a fishing line, having a free end in relaxed state and a portion in tension extending forwardly from said piece of fishing equipment, said fishing line being wound at least one and one-half times around the shoulder, with a section of the fishing line near said free end being compressed and retained within the groove solely by an overlying generally parallel portion of the fishing line.

22. An apparatus in accordance with claim 21, wherein said shoulder projects generally transversely of the forwardly extending portion of the fishing line.

23. An apparatus in accordance with claim 21, further comprising a block extending across the groove and spaced from the shoulder a distance less than the diameter of the line, said block and fishing line in combination being sufficiently resilient to allow the fishing line to snap into the groove between the shoulder and block.

24. An apparatus in accordance with claim 21, further comprising a slotted guide projecting forwardly from the piece of fishing equipment, whereby the forwardly projecting portion of the fishing line may extend from the shoulder, through the slotted guide and beyond.

* * * * *